United States Patent
Chen et al.

(10) Patent No.: US 12,280,781 B2
(45) Date of Patent: Apr. 22, 2025

(54) SYSTEMS AND METHODS FOR CONTROLLING AUTONOMOUS MOBILE ROBOTS IN A MANUFACTURING ENVIRONMENT

(71) Applicant: Ford Global Technologies, LLC, Dearborn, MI (US)

(72) Inventors: Yifan Chen, Ann Arbor, MI (US); Gregory P. Linkowski, Dearborn, MI (US); Meghna Menon, Rochester Hills, MI (US); Sarah Garrow, Detroit, MI (US); Geoffrey Horowitz, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 17/559,451

(22) Filed: Dec. 22, 2021

(65) Prior Publication Data
US 2023/0195123 A1    Jun. 22, 2023

(51) Int. Cl.
*B60W 30/18* (2012.01)

(52) U.S. Cl.
CPC ... *B60W 30/18154* (2013.01); *B60W 2555/60* (2020.02); *B60W 2556/45* (2020.02)

(58) Field of Classification Search
CPC .. G05D 1/0214; G05D 1/0238; G05D 1/0289; G05D 2201/0216; B60W 30/18154; B60W 2555/60; B60W 2555/45
USPC .......................................................... 701/23
See application file for complete search history.

(56) References Cited

U.S. PATENT DOCUMENTS

| | | | |
|---|---|---|---|
| 9,046,892 B2 | 6/2015 | Jang et al. | |
| 9,513,627 B1* | 12/2016 | Elazary | G05B 19/41895 |
| 10,037,029 B1* | 7/2018 | Russell | G01C 21/206 |
| 10,089,586 B2 | 10/2018 | Vestal et al. | |
| 10,642,282 B2 | 5/2020 | Kichkaylo | |
| 10,962,985 B2 | 3/2021 | Collett et al. | |
| 2006/0095160 A1* | 5/2006 | Orita | G05D 1/027 |
| | | | 700/248 |
| 2006/0265103 A1* | 11/2006 | Orita | G05D 1/0251 |
| | | | 700/245 |

(Continued)

FOREIGN PATENT DOCUMENTS

| | | |
|---|---|---|
| CN | 112859847 | 5/2021 |
| CN | 111708371 | 9/2021 |

*Primary Examiner* — Marc Burgess
*Assistant Examiner* — Michael T Dowling
(74) *Attorney, Agent, or Firm* — Burris Law, PLLC

(57) ABSTRACT

A method for controlling a plurality of autonomous mobile robots (AMRs) in a manufacturing environment having an intersection includes obtaining a plurality of routes associated with the plurality of AMRs, velocity information associated with the plurality of AMRs, and priority information associated with the plurality of AMRs, and determining a plurality of arrival times associated with the plurality of AMRs based on the velocity information and the plurality of routes. The method includes generating a plurality of intersection reservations based on the plurality of arrival times and the priority information, where each intersection reservation from among the plurality of intersection reservations corresponds to an AMR from among the plurality of AMRs, and controlling a movement of the plurality of AMRs through the intersection based on the plurality of intersection reservations.

20 Claims, 5 Drawing Sheets

(56) References Cited

U.S. PATENT DOCUMENTS

| | | | | |
|---|---|---|---|---|
| 2014/0288696 | A1* | 9/2014 | Lert | B65G 1/1373 |
| | | | | 700/216 |
| 2018/0239343 | A1* | 8/2018 | Voorhies | G05D 1/0289 |
| 2019/0314991 | A1* | 10/2019 | Liu | B25J 9/1666 |
| 2020/0065749 | A1* | 2/2020 | Emmrich | G06Q 10/08 |
| 2020/0193812 | A1 | 6/2020 | Morris | |
| 2021/0078175 | A1* | 3/2021 | Liu | G05D 1/0223 |
| 2023/0282104 | A1* | 9/2023 | Li | G08G 1/096783 |
| | | | | 701/423 |

\* cited by examiner

SYSTEMS AND METHODS FOR CONTROLLING AUTONOMOUS MOBILE ROBOTS IN A MANUFACTURING ENVIRONMENT

FIELD

The present disclosure relates to systems and methods for controlling autonomous mobile robots in a manufacturing environment.

BACKGROUND

The statements in this section merely provide background information related to the present disclosure and may not constitute prior art.

A manufacturing environment can include one or more mobile robots that perform various automated tasks, such as moving materials and tools within the manufacturing environment. The mobile robots may autonomously travel along a defined path and one or more intersections to arrive at a given destination within the manufacturing environment and subsequently perform an automated task. However, the defined paths of the mobile robots may coincide at an intersection at a given time, thereby therefore inhibiting the efficiency of the automated tasks performed by the mobile robots. These issues with the use of mobile robots in a manufacturing environment, among other issues with mobile robots, are addressed by the present disclosure.

SUMMARY

This section provides a general summary of the disclosure and is not a comprehensive disclosure of its full scope or all of its features.

The present disclosure provides a method for controlling a plurality of autonomous mobile robots (AMRs) in a manufacturing environment having an intersection. The method includes obtaining a plurality of routes associated with the AMRs, velocity information associated with the AMRs, and priority information associated with the plurality of AMRs, and determining a plurality of arrival times associated with the plurality of AMRs based on the velocity information and the plurality of routes. The method includes generating a plurality of intersection reservations based on the plurality of arrival times and the priority information, where each intersection reservation from among the plurality of intersection reservations corresponds to an AMR from among the plurality of AMRs, and controlling a movement of the plurality of AMRs through the intersection based on the plurality of intersection reservations.

In one form, the priority information is based on a payload type of the AMR, a physical characteristic of the AMR, or a combination thereof. In one form, the method includes generating an intersection queue based on the plurality of intersection reservations, where the intersection queue includes a first intersection reservation from among the plurality of intersection reservations associated with a first AMR and a first arrival time and a second intersection reservation from among the plurality of intersection reservations associated with a second AMR and a second arrival time. The method includes generating a sequence of the intersection queue based on the first arrival time and the second arrival time, where the movement of the plurality of AMRs through the intersection is further based on the sequence of the intersection queue. In one form, in response to the sequence of the intersection queue indicating that the second arrival time is subsequent to the first arrival time, controlling the movement of the plurality of AMRs through the intersection based on the sequence of the intersection queue further comprises controlling a movement of the first AMR through the intersection prior to controlling a movement of the second AMR through the intersection.

In one form, the method includes determining whether the second arrival time is within a threshold time difference of the first arrival time, determining first priority information associated with the first AMR and second priority information associated with the second AMR, and generating the sequence of the intersection queue based on the first priority information and the second priority information in response to the second arrival time being within the threshold time difference of the first arrival time. In one form, the method further includes determining whether a first AMR from among the plurality of AMRs is within a threshold distance of the intersection, and controlling a movement of the first AMR through the intersection based on a first intersection reservation from among the plurality of intersection reservations in response to the first AMR being within the threshold distance of the intersection. In one form, the method further includes determining whether a first AMR from among the plurality of AMRs is associated with a first intersection reservation from among the plurality of intersection reservations, and inhibiting a movement of the first AMR through the intersection in response to the first AMR not being associated with the first intersection reservation. In one form, the method further includes controlling the movement of the plurality of AMRs through the intersection based on sensor data obtained from one or more infrastructure sensors, where the sensor data corresponds to one or more detected obstacles of the intersection.

The present disclosure provides a method for controlling a plurality of autonomous mobile robots (AMRs) in a manufacturing environment having an intersection. The method includes obtaining a plurality of routes associated with the AMRs, velocity information associated with the AMRs, intersection movement information associated with the AMRs, and priority information associated with the plurality of AMRs and determining a plurality of arrival times associated with the plurality of AMRs based on the velocity information and the plurality of routes. The method includes generating a plurality of intersection reservations based on the plurality of arrival times, the priority information, and the intersection movement information, where each intersection reservation from among the plurality of intersection reservations corresponds to an AMR from among the plurality of AMRs, and where the intersection defines an intersection region and a plurality of stop regions, and controlling a movement of the plurality of AMRs through the intersection region based on the plurality of intersection reservations.

In one form, the intersection movement information includes an intersection movement time that is indicative of an amount of time to traverse through the intersection region. In one form, the priority information is based on a payload type of the AMR, a physical characteristic of the AMR, or a combination thereof. In one form, the method further includes generating an intersection queue based on the plurality of intersection reservations, where the intersection queue includes a first intersection reservation from among the plurality of intersection reservations associated with a first AMR, a first arrival time, and a first intersection movement time and a second intersection reservation from among the plurality of intersection reservations associated with a second AMR, a second arrival time, and a second intersection movement time. The method further includes generating a sequence of the intersection queue based on the first arrival time, the first intersection movement time, the second arrival time, and the second intersection movement time, where the movement of the plurality of AMRs through the intersection is further based on the sequence of the intersection queue.

In one form, in response to the sequence of the intersection queue indicating that a first sum of the first arrival time and the first intersection movement time is less than a second sum of the second arrival time and the second intersection movement time, controlling the movement of the plurality of AMRs through the intersection based on the sequence of the intersection queue further comprises controlling a movement of the first AMR through the intersection prior to controlling a movement of the second AMR through the intersection. In one form, the method further includes determining whether the first sum is within a threshold time difference of the second sum, determining first priority information associated with the first AMR and second priority information associated with the second AMR, and generating the sequence of the intersection queue based on the first priority information and the second priority information in response to the first sum being within the threshold time difference of the second sum. In one form, the method further includes obtaining a plurality of lane information associated with the plurality of AMRs and controlling the movement of the plurality of AMRs through the intersection region based on the lane information.

The present disclosure provides a system for controlling a plurality of autonomous mobile robots (AMRs) in a manufacturing environment having an intersection, where the intersection defines an intersection region and a plurality of stop regions. The system includes a processor and a nontransitory computer-readable medium including instructions that are executable by the processor. The instructions include obtaining a plurality of routes associated with the AMRs, velocity information associated with the AMRs, intersection movement information associated with the AMRs, and priority information associated with the plurality of AMRs, where the intersection movement information includes an intersection movement time that is indicative of an amount of time to traverse through the intersection region, and where the priority information is based on a payload type of the AMR, a physical characteristic of the AMR, or a combination thereof. The instructions include determining a plurality of arrival times associated with the plurality of AMRs based on the velocity information and the plurality of routes and generating a plurality of intersection reservations based on the plurality of arrival times, the priority information, and the intersection movement information, where each intersection reservation from among the plurality of intersection reservations corresponds to an AMR from among the plurality of AMRs. The instructions include controlling a movement of the plurality of AMRs through the intersection region based on the plurality of intersection reservations.

In one form, the instructions further include generating an intersection queue based on the plurality of intersection reservations, where the intersection queue includes a first intersection reservation from among the plurality of intersection reservations associated with a first AMR, a first arrival time, and a first intersection movement time and a second intersection reservation from among the plurality of intersection reservations associated with a second AMR, a second arrival time, and a second intersection movement time. The instructions further include generating a sequence of the intersection queue based on the first arrival time, the first intersection movement time, the second arrival time, and the second intersection movement time, where the movement of the plurality of AMRs through the intersection is further based on the sequence of the intersection queue.

In one form, in response to the sequence of the intersection queue indicating that a first sum of the first arrival time and the first intersection movement time is less than a second sum of the second arrival time and the second intersection movement time, the instructions for controlling the movement of the plurality of AMRs through the intersection based on the sequence of the intersection queue further comprises controlling a movement of the first AMR through the intersection prior to controlling a movement of the second AMR through the intersection. In one form, the instructions further include determining whether the first sum is within a threshold time difference of the second sum, determining first priority information associated with the first AMR and second priority information associated with the second AMR, and generating the sequence of the intersection queue based on the first priority information and the second priority information in response to the first sum being within the threshold time difference of the second sum. In one form, the instructions further include obtaining a plurality of lane information associated with the plurality of AMRs and controlling the movement of the plurality of AMRs through the intersection region based on the lane information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3A:
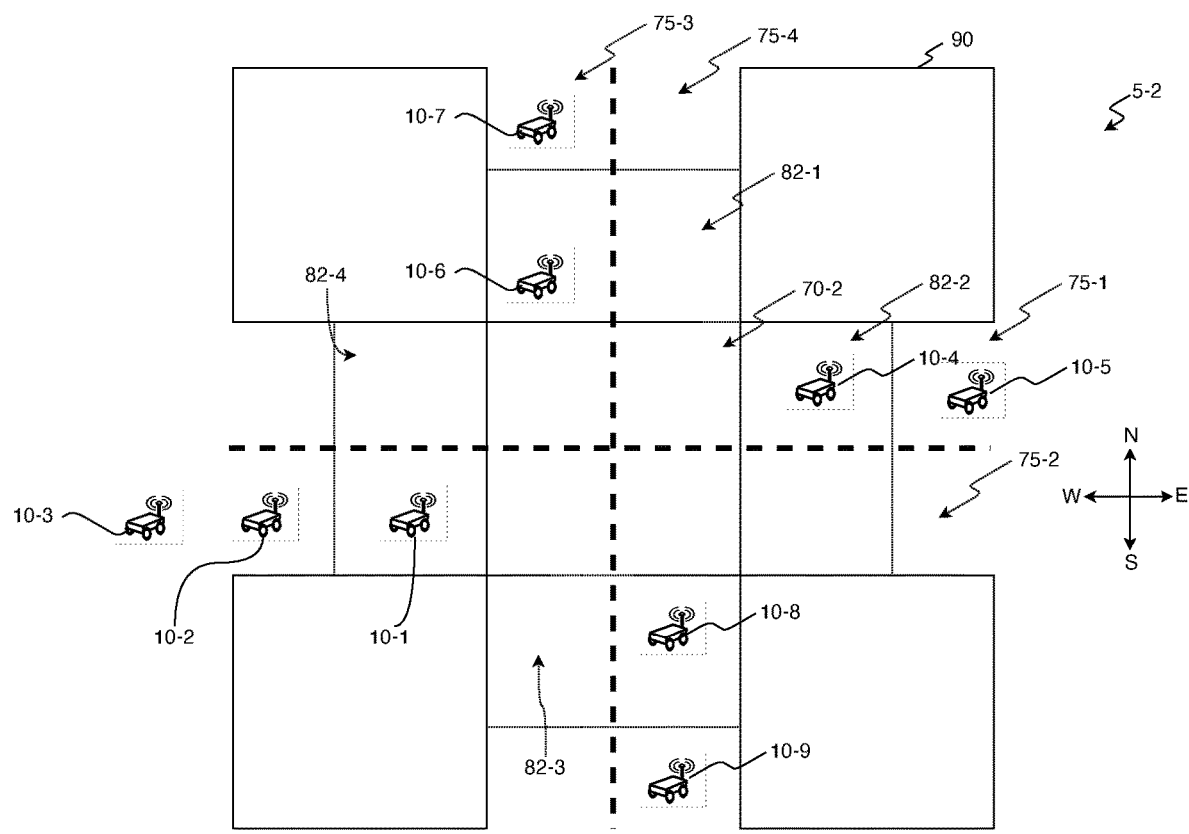
FIG. 3A illustrates a plurality of autonomous mobile robots and an intersection having multiple lanes and a stop region in accordance with the teachings of the present disclosure.
Figure 3B:
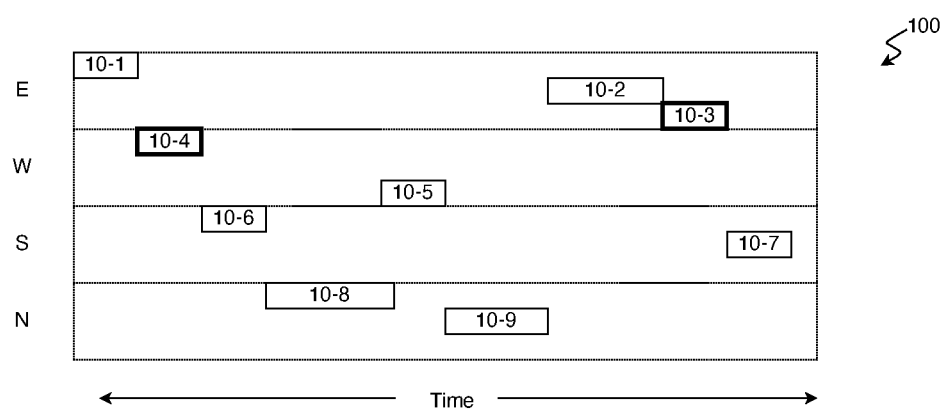
FIG. 3B is a functional block diagram of a plurality of autonomous mobile robots traversing through an intersection based on an intersection reservation in accordance with the teachings of the present disclosure.
Figure 3C:
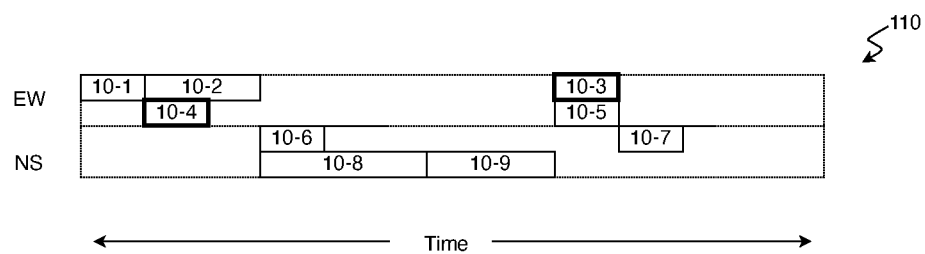
Figure 4:
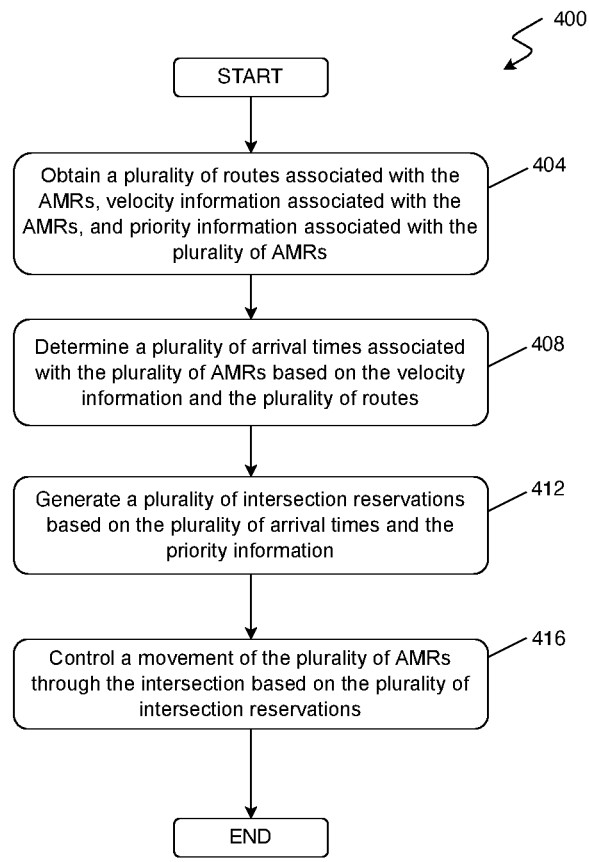

FIG. 3C is another functional block diagram of a plurality of autonomous mobile robots traversing through an intersection based on an intersection reservation in accordance with the teachings of the present disclosure; and FIG. 4 is an example control routine for controlling a movement of the autonomous mobile robots through an intersection in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides an intersection management system that controls the movement of a plurality of autonomous mobile robots through various intersections of the manufacturing environment. Specifically, the intersection management system controls the movement of the autonomous mobile robots based on a plurality of intersection reservations, which are determined based on arrival times of the given intersections, priority information associated with the autonomous mobile robots, and/or intersection movement information associated with the autonomous mobile robots. Accordingly, the intersection management system enables autonomous mobile robots having different communication protocols, payloads, and mobility characteristics to autonomously navigate within defined intersections of the manufacturing environment such that path and timing conflicts are inhibited.

Figure 1:
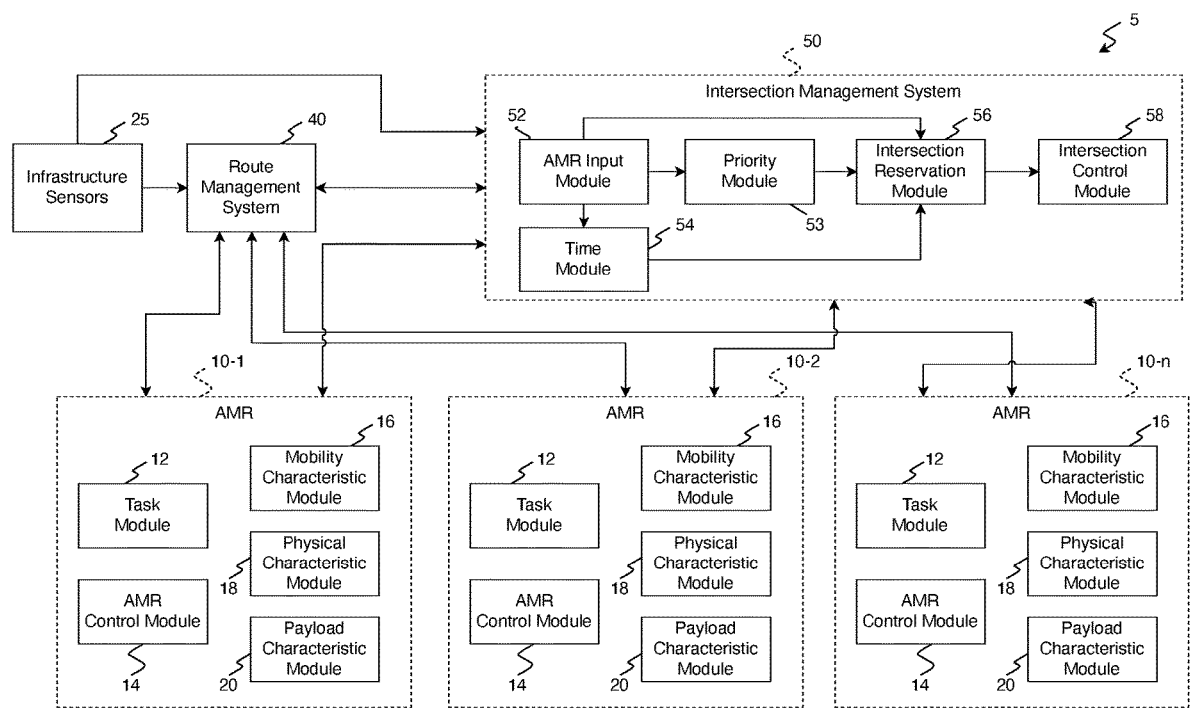
FIG. 1 is a functional block diagram of a manufacturing environment having a plurality of autonomous mobile robots and an intersection management system in accordance with the teachings of the present disclosure.

Referring to FIG. 1, a manufacturing environment 5 is provided and generally includes a plurality of autonomous mobile robots (AMRs) 10-1, 10-2, 10-n (collectively referred to hereinafter as "AMRs 10"), infrastructure sensors 25, a route management system (RMS) 40, and an intersection management system (IMS) 50. It should be readily understood that any one of the components of the AMRs 10, the RMS 40, and the IMS 50 can be provided at the same location or distributed at different locations (e.g., via one or more edge computing devices) and communicably coupled accordingly. In one form, the AMRs 10, the RMS 40, and the IMS 50 are communicably coupled using a wireless communication protocol (e.g., a Bluetooth®-type protocol, a cellular protocol, a wireless fidelity protocol, a near-field communication (NFC) protocol, an ultra-wideband (UWB) protocol, among others).

In one form, the AMRs 10 are mobile robots that are partially or fully autonomous and are configured to autonomously move to various locations of the manufacturing environment 5 as instructed by the RMS 40 and the IMS 50. To autonomously move itself, an AMR control module 14 is configured to control various movement systems of the AMR 10 (e.g., propulsion systems, steering systems, and/or brake systems) via actuators and based on one or more autonomous navigation sensors of the AMR 10 (e.g., a global navigation satellite system (GNSS) sensor, an imaging sensor, a local position sensor, among others). Furthermore, the AMR control module 14 is configured to operate the actuators to control the motion of one or more robotic links (e.g., robotic arms) attached thereto and thereby perform one or more automated tasks defined by a task module 12. The one or more automated tasks may refer to one or more motions the AMR 10 performs to achieve a desired result (e.g., removing a part from a bin, loading a workpiece into a fixture, transporting a payload from one location to another, among others).

In one form, the AMRs 10 include a mobility characteristic module 16, a physical characteristic module 18, and a payload characteristic module 20. In one form, the mobility characteristic module 16 is configured to broadcast a mobility characteristic of the AMRs 10 to the IMS 50. As used herein, "mobility characteristic" refers to any quantitative or qualitative mobility property of the AMR 10. Example mobility characteristics of the AMR 10 include, but are not limited to, a velocity (e.g., a current velocity or a maximum operating velocity), a payload mass (e.g., the impact of a given payload mass value with respect to the AMR velocity), and/or an AMR type (e.g., a walking AMR, a rolling AMR, a flying AMR, among other AMR types).

In one form, the physical characteristic module 18 is configured to broadcast a physical characteristic of the AMRs 10 to the IMS 50. As used herein, "physical characteristic" refers to any quantitative or qualitive physical property of the AMR 10. Example physical characteristics of the AMR 10 include, but are not limited to, a size, weight, and/or dimensions of the AMR 10. In one form, the payload characteristic module 20 is configured to broadcast a payload characteristic of the AMRs 10 to the IMS 50. As used herein, "payload characteristic" refers to any quantitative or qualitive property of the payload of the AMR 10. Example payload characteristics, but are not limited to, a payload type, size, weight, and/or dimensions of the payload of the AMR 10.

To perform the functionality described herein, the AMRs 10 may include one or more processor circuits that are configured to execute machine-readable instructions stored in one or more nontransitory computer-readable mediums, such as a random-access memory (RAM) circuit and/or read-only memory (ROM) circuit. The AMRs 10 may also include other components for performing the operations described herein, such as movement drivers and systems, transceivers, routers, and/or input/output interface hardware.

In one form, the infrastructure sensors 25 are imaging sensors that obtain imaging data of the manufacturing environment 5 and detect objects within the manufacturing environment 5 (e.g., the AMRs 10). The infrastructure sensors 25 may include a two-dimensional camera, a three-dimensional camera, an infrared sensor, a radar scanner, a laser scanner, a LIDAR sensor, an ultrasonic sensor, among others. In one form, the infrastructure sensors 25 are disposed on various infrastructure elements of the manufacturing environment 5, such as an overhead beam, a tower, a light pole, a building, a sign, a machining device, a stationary storage rack/shelving system, among other fixed elements of the manufacturing environment 5. As an example, the infrastructure sensors 25 are selectively positioned on an infrastructure element in the manufacturing environment 5 such that the corresponding image data enhances the collision avoidance routines performed by the AMRs 10 and/or the RMS 40, as described below in further detail.

In one form, the RMS 40 is configured to generate routes for the AMRs 10 and instruct the AMRs 10 to autonomously navigate within the manufacturing environment 5 based on the routes. As an example, the RMS 40 instructs the AMRs 10 to autonomously navigate by transmitting the path to the AMR control module 14 and instructing the AMR 10 to travel to the destination based on the path. As another example, the RMS 40 remotely and autonomously controls the AMR 10s as they travel to their respective destinations. To control the autonomous movement of the AMRs 10, the RMS 40 and/or the AMRs 10 may employ known collision avoidance routines and autonomous navigation routines, such as a path planning routine, a maneuver planning routine, and/or a trajectory planning routine. As an example, the RMS 40 employs a reservation-based management system that reserves a defined path for the AMRs 10 based on a continuous path planning routine, temporal information associated with he defined path, and priority information associated with the AMRs 10. Example reservation management systems are described in U.S. patent application Ser. No. 17/559,268 titled "SYSTEMS AND METHODS FOR CONTROLLING AUTONOMOUS MOBILE ROBOTS IN A MANUFACTURING ENVIRONMENT,"

which is commonly owned with the present application and the contents of which are incorporated herein by reference in its entirety.

Figure 2:
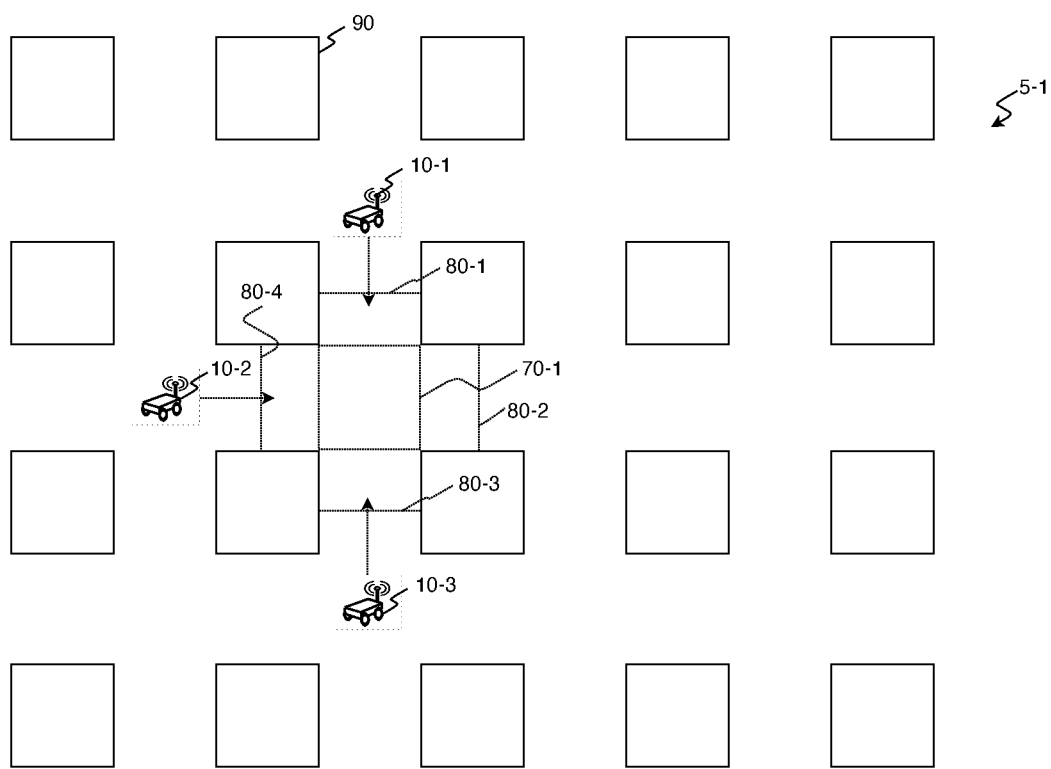
FIG. 2 illustrates an intersection and a plurality of autonomous mobile robots in accordance with the teachings of the present disclosure.

In one form, the manufacturing environment 5 includes one or more intersection regions. As used herein, "intersection region" refers to a region of the manufacturing environment 5 in which the paths of the AMRs 10 can intersect. As an example and as shown in FIG. 2, manufacturing environment 5-1 (as the manufacturing environment 5) may include an intersection region 70-1 in which the paths of AMRs 10-1, 10-2, 10-3 (as shown by the dotted arrows) may intersect and that are at least partially defined by nontraverseable regions 90. As another example and as shown in FIG. 3A, manufacturing environment 5-2 (as the manufacturing environment 5) may include traffic lanes 75-1, 75-2, 75-3, 75-4 (collectively referred to hereinafter as "traffic lanes 75") and an intersection region 70-2 in which the paths of AMRs 10-1, 10-2, 10-3, 10-4, 10-5, 10-6, 10-7, 10-8, 10-9 may intersect. It should be understood that the manufacturing environment 5 may have any number and/or orientations of traffic lanes 75 in other forms and is not limited to the example described herein.

In one form, the manufacturing environment 5 includes one or more stop regions. As used herein, "stop region" refers to a region of the manufacturing environment 5 in which the AMRs 10 wait for a command from the IMS 50 before autonomously navigating through a corresponding intersection region. As an example and as shown in FIG. 2, the manufacturing environment 5-1 includes stop regions 80-1, 80-2, 80-3, 80-4 surrounding the intersection region 70-1 in which the AMRs 10-1, 10-2, 10-3 remain until receiving a command from the IMS 50 to travel through the intersection region 70-1. As another example and as shown in FIG. 3A, the manufacturing environment 5-2 includes stop regions 82-1, 82-2, 82-3, 82-4 (collectively referred to hereinafter as "stop regions 82") surrounding the intersection region 70-2 in which the AMRs 10-1, 10-2, 10-3, 10-4, 10-5, 10-6, 10-7, 10-8, 10-9 remain until receiving a command from the IMS 50 to travel through the intersection region 70-2. Additional details regarding the functionality of the IMS 50 are provided below. An intersection region and one or more surrounding/adjacent stop regions are collectively referred to hereinafter as "an intersection".

In one form, the RMS 40 is configured to determine intersection movement information associated with each of the AMRs 10. As used herein, "intersection movement information" refers to an amount of time to traverse through a given intersection region along the route of the AMR 10. In one form, the intersection movement information is determined based on the mobility characteristic obtained from the mobility characteristic module 16 and using known velocity-to-time conversion relations. To perform the functionality described herein, the RMS 40 may include one or more processor circuits that are configured to execute machine-readable instructions stored in one or more non-transitory computer-readable mediums, such as a RAM circuit and/or ROM circuit.

In one form, the IMS 50 includes an AMR input module 52, a priority module 53, a time module 54, an intersection reservation module 56, and an intersection control module 58. In one form, the AMR input module 52 is configured to obtain a plurality of routes associated with the AMRs 10 from the RMS 40 and/or the AMRs 10, intersection movement information associated with the AMRs 10 from the RMS 40, sensor data from the infrastructure sensors 25, and/or the mobility characteristics (e.g., velocity information), physical characteristics, and the payload characteristics from the mobility characteristic modules 16, physical characteristic modules 18, and the payload characteristic modules 20, respectively, of the AMRs 10. Accordingly, the AMR input module 52 may include one or more transceivers, routers, and/or input/output interface hardware for obtaining the information from the AMRs 10, the RMS 40, and/or the infrastructure sensors 25.

In one form, the priority module 53 is configured to determine priority information associated with the plurality of AMRs 10. As an example, the priority module 53 determines the priority information based on a predefined control hierarchy and at least one of a payload type of the AMRs 10 as determined by the payload characteristic module 20 and a physical characteristic of the plurality of AMRs 10 as determined by the physical characteristic module 18.

In one form, the time module 54 is configured to determine a plurality of arrival times for each of the AMRs 10 based on the mobility characteristic as determined by the mobility characteristic module 16 (e.g., the velocity of the AMR 10, the payload mass of the AMR 10, and/or the type of AMR 10) and the routes of the AMRs 10. In one form, the time module 54 determines the arrival time of the AMRs 10 as a discrete time value in which the AMRs 10 arrive proximate to a stop region surrounding and/or adjacent a given intersection region of the route. In one form, the time module 54 determines the discrete time value using known velocity-to-time conversion relations and/or a communication offset time associated with the AMRs 10. As used herein, "communication offset time" refers to a communication delay between the AMRs 10 and the IMS 50 resulting from, for example, processing speeds of the AMR 10 and the IMS 50, delays associated with a given communication protocol, noise pollution of the manufacturing environment 5, among other factors that may cause a communication delay between the AMRs 10 and the IMS 50.

In one form, the intersection reservation module 56 is configured to generate one or more intersection reservations for each AMR 10 based on the route associated with the AMR 10, the intersection movement time associated with the AMR 10, the arrival time of the AMR 10 as determined by the time module 54, and/or the priority information of the AMR 10 relative to other AMRs 10 as determined by the priority module 53. Example intersection reservations are shown below in Tables 1-6 for AMRs 10-1, 10-2 traveling along a given route, where each route each coincides with three intersections from among a plurality of intersections of the manufacturing environment 5.

TABLE 1

Intersection Reservation - AMR 10-1

| Reservation ID | Intersection ID | Arrival Time | Intersection Movement Time/ Information | Time Conflict With Other AMRs? | Highest Priority? |
|---|---|---|---|---|---|
| $R_1$ | $INT_1$ | $T_1$ | $T_x$ | NO | — |

TABLE 2

Intersection Reservation - AMR 10-1

| Reservation ID | Intersection ID | Arrival Time | Intersection Movement Time/ Information | Time Conflict With Other AMRs? | Highest Priority? |
|---|---|---|---|---|---|
| $R_2$ | $INT_2$ | $T_2$ | $T_x$ | NO | — |

TABLE 3

Intersection Reservation - AMR 10-1

| Reservation ID | Intersection ID | Arrival Time | Intersection Movement Time/ Information | Time Conflict With Other AMRs? | Highest Priority? |
|---|---|---|---|---|---|
| $R_3$ | $INT_3$ | $T_3$ | $T_x$ | $AMR_{10-2}$ | NO |

TABLE 4

Intersection Reservation - AMR 10-2

| Reservation ID | Intersection ID | Arrival Time | Intersection Movement Time/ Information | Time Conflict With Other AMRs? | Highest Priority? |
|---|---|---|---|---|---|
| $R_4$ | $INT_3$ | $T_3$ | $T_y$ | $AMR_{10-1}$ | YES |

TABLE 5

Intersection Reservation - AMR 10-2

| Reservation ID | Intersection ID | Arrival Time | Intersection Movement Time/ Information | Time Conflict With Other AMRs? | Highest Priority? |
|---|---|---|---|---|---|
| $R_5$ | $INT_1$ | $T_4$ | $T_y$ | NO | — |

TABLE 6

Intersection Reservation - AMR 10-2

| Reservation ID | Intersection ID | Arrival Time | Intersection Movement Time/ Information | Time Conflict With Other AMRs? | Highest Priority? |
|---|---|---|---|---|---|
| $R_6$ | $INT_4$ | $T_5$ | $T_y$ | NO | — |

Specifically, in Tables 1-6, the intersection reservation module 56 defines three intersection reservations for AMR 10-1 ($R_1$-$R_3$) for a first, second, and third intersection reservation ($INT_1$-$INT_3$) along the route of AMR 10-1, and three intersection reservations for AMR 10-2 ($R_4$-$R_6$) for a fourth intersection ($INT_4$) and the first and third intersection reservations ($INT_1$ and $INT_3$) along the route of AMR 10-2. As shown in Tables 1-6, each intersection reservation indicates an arrival time, the intersection movement information (e.g., the velocities of the AMRs 10-1, 10-2 are different and therefore have different intersection movement times $T_x$ and $T_y$), time conflicts with other AMRs 10 based on at least one of the arrival time and the intersection movement information, and priority information relative to other conflicting AMRs 10 as determined by the priority module 53.

Furthermore, in one form, the intersection reservation module 56 is configured to generate, for each intersection, an intersection queue based on the one or more intersection reservations. Each intersection queue includes one or more reservations of the AMRs 10, and a sequence of the one or more reservations is based on at least one of the arrival times, intersection movement information of the intersection reservations, and/or the priority information, as shown below in Table 7.

TABLE 7

Intersection Queues

| Intersection ID | $INT_1$ | $INT_2$ | $INT_3$ | $INT_4$ |
|---|---|---|---|---|
| Reservation Sequence | $R_1$ $R_5$ | $R_2$ | $R_4$ $R_3$ | $R_6$ |

As shown in Table 7, the intersection reservation module 56 assigns the first and fifth reservations ($R_1$ and $R_5$) to the first intersection ($INT_1$) such that the AMR 10-1 reserves the first intersection prior to the AMR 10-2 reserving the first intersection and without comparing the priority information of the AMRs 10-1, 10-2 since no time conflict is present. That is, a difference between the arrival times of the first and fifth reservations ($R_1$ and $R_5$) is greater than a threshold value and, therefore, the intersection reservation module 56 generates the queue such that the AMR 10-1 reserves the first intersection prior to the AMR 10-2 reserving the first intersection.

Additionally and as shown in Table 7, the intersection reservation module 56 assigns the third and fourth reservations ($R_3$ and $R_4$) to the third intersection ($INT_3$) such that the AMR 10-2 reserves the third intersection prior to the AMR 10-1 reserving the third intersection. That is, a difference between the arrival times of the third and fourth reservations ($R_3$ and $R_4$) is within than a threshold time value and the AMR 10-2 has the higher priority relative to the AMR 10-1 (as determined by the priority module 53). As such, the intersection reservation module 56 generates the queue such that the AMR 10-2 reserves the third intersection prior to the AMR 10-1 reserving the third intersection.

Furthermore, the intersection reservation module 56 assigns the second and sixth reservations ($R_2$ and $R_6$) to the second and fourth intersections ($INT_2$ and $INT_4$), respectively, such that the AMR 10-1 reserves the second intersection based on the given arrival time and the time movement information and the AMR 10-2 reserves the fourth intersection based on the given arrival time and the time movement information. It should be understood that Table 7 may include any number and/or sequence of reservations for each intersection and is not limited to the examples described herein. It should also be understood that Table 7 may include any number of intersections and corresponding intersection queues and is not limited to the examples described herein.

In one form, the intersection control module 58 is configured to control the movement of the AMRs 10 based on the plurality of intersection reservations. In one form, the intersection control module 58 controls the movement of the AMRs through a given intersection based on the sequence of intersection reservations of the corresponding intersection queue. In one form, the intersection control module 58 controls the movement of the AMRs 10 in response to the AMRs 10 being within a threshold distance of the intersection (e.g., the AMRs 10 are position within one of the stop regions 82). Additionally, when the AMR 10 is within the threshold distance of the intersection, the intersection control module 58 is configured to determine whether the AMR 10 has a corresponding reservation and inhibits the movement of the AMR 10 if it is not associated with a reservation, thereby improving the traffic efficiency of the AMRs 10 within the manufacturing environment 5.

To perform the functionality described herein, the intersection control module 58 may instruct the AMRs 10 to autonomously navigate through the given intersection by transmitting the path to the AMR control module 14 and instructing the AMR 10 to travel through the given intersection. As another example, the intersection control module 58 remotely and autonomously controls the AMR 10s as they travel through the given intersection while avoiding obstacles detected by the infrastructure sensors 25. To control the autonomous movement of the AMRs 10 through the intersections, the intersection control module 58 may employ known collision avoidance routines and autonomous navigation routines, such as a path planning routine, a maneuver planning routine, and/or a trajectory planning routine.

As an example and as shown in Table 7, in response to the intersection queue indicating that the arrival time of the fifth reservation ($R_5$) is subsequent to the arrival time of the first reservation ($R_1$) at the first intersection ($INT_1$), the intersection control module 58 is configured to first control the movement the AMR 10-1 through the first intersection in accordance with the first reservation prior to controlling the movement of the AMR 10-2 through the first intersection in accordance with the fifth reservation. As another example and as shown in Table 7, in response to the intersection queue indicating that sum of the arrival time and the intersection movement time of the fourth reservation ($T_3+T_y$) is less than a sum of the arrival time and intersection movement time of the third reservation ($T_3+T_x$) at the third intersection ($INT_3$), the intersection control module 58 is configured to first control the movement the AMR 10-2 through the third intersection in accordance with the fourth reservation ($R_4$) prior to controlling the movement of the AMR 10-1 through the third intersection in accordance with the third reservation ($R_3$).

As an additional example and referring to FIGS. 3A-3B, the intersection control module 58 determines that AMRs 10-1, 10-4, 10-6, 10-8 are within the stop regions 82 surrounding the intersection region 70-2 and controls the movement of the AMRs 10 such that one of the AMRs 10 moves through the intersection region 70-2 at a given time (i.e., one of the AMRs 10 moves in the cardinal north, south, east, or west directions at a given time). As shown in graph 100 of FIG. 3B, the intersection control module 58 may determine that the sequence of the intersection queue corresponds to first controlling the AMR 10-1 through the intersection region 70-2 since the arrival time and intersection movement time of the corresponding reservation precedes the arrival time of the reservations associated with AMRs 10-4, 10-6, 10-8. Subsequently, the sequence of the intersection queue may correspond to controlling the movement of AMR 10-4 through the intersection region 70-2 since it has a higher priority than the AMRs 10-6, 10-8. The sequence of the intersection queue may also correspond to controlling the movement of AMR 10-6 subsequent to controlling the movement of AMR 10-4 since the intersection movement time is less than the AMR 10-8, and the sequence of the intersection queue may correspond to controlling the movement of AMR 10-8 subsequent to controlling the AMR 10-6 through the intersection region 70-2. The intersection control module 58 may similarly control the movement of the AMRs 10-2, 10-3, 10-5, 10-7, 10-9 when they are positioned within the stop regions 82.

As an additional example and referring to FIGS. 3A and 3C, the intersection control module 58 determines that AMRs 10-1, 10-4, 10-6, 10-8 are within the stop regions 82 surrounding the intersection region 70-2 and controls the movement of the AMRs 10 such that more than one of the AMRs 10 can through the intersection region 70-2 at a given time (i.e., two AMRs 10 can simultaneously move in the cardinal east-west or north-south directions at a given time). As shown in graph 110 of FIG. 3C, the intersection control module 58 may determine that the sequence of the intersection queue corresponds to first controlling the AMR 10-1 through the intersection region 70-2 since the arrival time and intersection movement time of the corresponding reservation precedes the arrival time of the reservations associated with AMRs 10-4, 10-6, 10-8. Subsequently, the sequence of the intersection queue may correspond to controlling the movement of AMR 10-4 and 10-2 through the intersection region 70-2 since AMR 10-4 has a higher priority than the AMR 10-6 and the sum of the arrival time and intersection movement time of AMR 10-2 is less than the sum of the arrival time and intersection movement time of AMR 10-6. The sequence of the intersection queue may also correspond to controlling the movement of AMR 10-6 subsequent to controlling the movement of AMRs 10-2, 10-4 through the intersection region 70-2. The intersection control module 58 may similarly control the movement of the AMRs 10-2, 10-3, 10-5, 10-7, 10-9 when they are positioned within the stop regions 82.

Referring to FIG. 4, a flowchart illustrating a routine 400 for controlling the AMRs 10 through an intersection is shown. At 404, the IMS 50 obtains a plurality of routes associated with the plurality of AMRs 10, velocity information associated with the plurality of AMRs 10, and priority information associated with the plurality of AMRs 10. At 408, the IMS 50 determines a plurality of arrival times associated with the plurality of AMRs 10 based on the velocity information and the plurality of routes. At the 412, the IMS 50 generates a plurality of intersection reservations based on the plurality of arrival times and the priority information. At 416, the IMS 50 controls a movement of the plurality of AMRs 10 through the intersection based on the plurality of intersection reservations.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling a plurality of autonomous mobile robots (AMRs) in a manufacturing environment having an intersection, the method comprising:
    obtaining a plurality of routes associated with the plurality of AMRs, velocity information associated with the plurality of AMRs, and priority information associated with the plurality of AMRs;
    determining a plurality of arrival times associated with the plurality of AMRs at a location proximate a stop region of the intersection before the plurality of AMRs arrive at the intersection, wherein the determination of the plurality of arrival times is based on the velocity information, the plurality of routes, and a communication delay between the plurality of AMRs and an intersection management system;
    generating a plurality of intersection reservations based on the determination of the plurality of arrival times and the priority information, wherein each intersection reservation from among the plurality of intersection reservations corresponds to an AMR from among the plurality of AMRs; and
    controlling a movement of the plurality of AMRs through the intersection based on the plurality of intersection reservations.

2. The method of claim 1, further comprising:
    determining the priority information based on a predefined control hierarchy, a payload type of the plurality of AMRs, and a physical characteristic of the plurality of AMRs.

3. The method of claim 1 further comprising:
    generating an intersection queue based on the plurality of intersection reservations, wherein the intersection queue includes:
        a first intersection reservation from among the plurality of intersection reservations associated with a first AMR and a first arrival time; and
        a second intersection reservation from among the plurality of intersection reservations associated with a second AMR and a second arrival time; and
    generating a sequence of the intersection queue based on the first arrival time and the second arrival time, wherein the movement of the plurality of AMRs through the intersection is further based on the sequence of the intersection queue.

4. The method of claim 3, wherein in response to the sequence of the intersection queue indicating that the second arrival time is subsequent to the first arrival time, controlling the movement of the plurality of AMRs through the intersection based on the sequence of the intersection queue further comprises:
    controlling a movement of the first AMR through the intersection prior to controlling a movement of the second AMR through the intersection.

5. The method of claim 3 further comprising:
    determining whether the second arrival time is within a threshold time difference of the first arrival time;
    determining first priority information associated with the first AMR and second priority information associated with the second AMR; and
    generating the sequence of the intersection queue based on the first priority information and the second priority information in response to the second arrival time being within the threshold time difference of the first arrival time.

6. The method of claim 1 further comprising:
    determining whether a first AMR from among the plurality of AMRs has a corresponding reservation and is within a threshold distance of the intersection; and
    inhibiting a movement of the first AMR in response to determining that the first AMR is not associated with the corresponding reservation.

7. The method of claim 1, wherein each reservation of the plurality of intersection reservations indicates an arrival time, intersection movement information, and one or more time conflicts based on the intersection movement information, wherein the intersection movement information indicates the velocity information associated with each AMR of the plurality of AMRs and a time corresponding to a movement of each AMR of the plurality of AMRs through the intersection.

8. The method of claim 1 further comprising controlling the movement of the plurality of AMRs through the intersection based on sensor data obtained from one or more infrastructure sensors, wherein the sensor data corresponds to one or more detected obstacles of the intersection.

9. A method for controlling a plurality of autonomous mobile robots (AMRs) in a manufacturing environment having an intersection, the method comprising:
    obtaining a plurality of routes associated with the plurality of AMRs, velocity information associated with the plurality of AMRs, intersection movement information associated with the plurality of AMRs, and priority information associated with the plurality of AMRs;
    determining a plurality of arrival times associated with the plurality of AMRs at a location proximate a stop region of the intersection before the plurality of AMRs arrive at the intersection, wherein the determination of the plurality of arrival times is based on the velocity information, the plurality of routes, and a communication delay between the plurality of AMRs and an intersection management system;

generating a plurality of intersection reservations based on the determination of the plurality of arrival times, the priority information, and the intersection movement information, wherein each intersection reservation from among the plurality of intersection reservations corresponds to an AMR from among the plurality of AMRs, and wherein the intersection defines an intersection region and a plurality of stop regions; and controlling a movement of the plurality of AMRs through the intersection region based on the plurality of intersection reservations.

10. The method of claim 9, wherein the intersection movement information includes an intersection movement time that is indicative of an amount of time to traverse through the intersection region.

11. The method of claim 9, further comprising:
determining the priority information based on a predefined control hierarchy, a payload type of the plurality of AMRs, and a physical characteristic of the plurality of AMRs.

12. The method of claim 9 further comprising:
generating an intersection queue based on the plurality of intersection reservations, wherein the intersection queue includes:
a first intersection reservation from among the plurality of intersection reservations associated with a first AMR, a first arrival time, and a first intersection movement time; and
a second intersection reservation from among the plurality of intersection reservations associated with a second AMR, a second arrival time, and a second intersection movement time; and
generating a sequence of the intersection queue based on the first arrival time, the first intersection movement time, the second arrival time, and the second intersection movement time, wherein the movement of the plurality of AMRs through the intersection is further based on the sequence of the intersection queue.

13. The method of claim 12, wherein in response to the sequence of the intersection queue indicating that a first sum of the first arrival time and the first intersection movement time is less than a second sum of the second arrival time and the second intersection movement time, controlling the movement of the plurality of AMRs through the intersection based on the sequence of the intersection queue further comprises:
controlling a movement of the first AMR through the intersection prior to controlling a movement of the second AMR through the intersection.

14. The method of claim 13 further comprising:
determining whether the first sum is within a threshold time difference of the second sum;
determining first priority information associated with the first AMR and second priority information associated with the second AMR; and
generating the sequence of the intersection queue based on the first priority information and the second priority information in response to the first sum being within the threshold time difference of the second sum.

15. The method of claim 9 further comprising:
obtaining a plurality of lane information associated with the plurality of AMRs; and controlling the movement of the plurality of AMRs through the intersection region based on the lane information.

16. A system for controlling a plurality of autonomous mobile robots (AMRs) in a manufacturing environment having an intersection, wherein the intersection defines an intersection region and a plurality of stop regions, the system comprising:
a processor; and
a non-transitory computer-readable medium including instructions that are executable by the processor, wherein the instructions include:
obtaining a plurality of routes associated with the plurality of AMRs, velocity information associated with the plurality of AMRs, intersection movement information associated with the plurality of AMRs, and priority information associated with the plurality of AMRs, wherein the intersection movement information includes an intersection movement time that is indicative of an amount of time to traverse through the intersection region, and wherein the priority information is based on a payload type of the plurality of AMRs, a physical characteristic of the plurality of AMRs, or a combination thereof;
determining a plurality of arrival times associated with the plurality of AMRs at a location proximate a stop region of the intersection before the plurality of AMRs arrive at the intersection, wherein the determination of the plurality of arrival times is based on the velocity information, the plurality of routes, and a communication delay between the plurality of AMRs and an intersection management system;
generating a plurality of intersection reservations based on the determination of the plurality of arrival times, the priority information, and the intersection movement information, wherein each intersection reservation from among the plurality of intersection reservations corresponds to an AMR from among the plurality of AMRs; and
controlling a movement of the plurality of AMRs through the intersection region based on the plurality of intersection reservations.

17. The system of claim 16, wherein the instructions further comprise:
generating an intersection queue based on the plurality of intersection reservations, wherein the intersection queue includes:
a first intersection reservation from among the plurality of intersection reservations associated with a first AMR, a first arrival time, and a first intersection movement time; and
a second intersection reservation from among the plurality of intersection reservations associated with a second AMR, a second arrival time, and a second intersection movement time; and
generating a sequence of the intersection queue based on the first arrival time, the first intersection movement time, the second arrival time, and the second intersection movement time, wherein the movement of the plurality of AMRs through the intersection is further based on the sequence of the intersection queue.

18. The system of claim 17, wherein in response to the sequence of the intersection queue indicating that a first sum of the first arrival time and the first intersection movement time is less than a second sum of the second arrival time and the second intersection movement time, the instructions for controlling the movement of the plurality of AMRs through the intersection based on the sequence of the intersection queue further comprises:

controlling a movement of the first AMR through the intersection prior to controlling a movement of the second AMR through the intersection.

19. The system of claim 18, wherein the instructions further comprise:

determining whether the first sum is within a threshold time difference of the second sum;

determining first priority information associated with the first AMR and second priority information associated with the second AMR; and generating the sequence of the intersection queue based on the first priority information and the second priority information in response to the first sum being within the threshold time difference of the second sum.

20. The system of claim 16, wherein the instructions further comprise:

obtaining a plurality of lane information associated with the plurality of AMRs; and controlling the movement of the plurality of AMRs through the intersection region based on the lane information.

\* \* \* \* \*